United States Patent Office 3,431,469
Patented Mar. 4, 1969

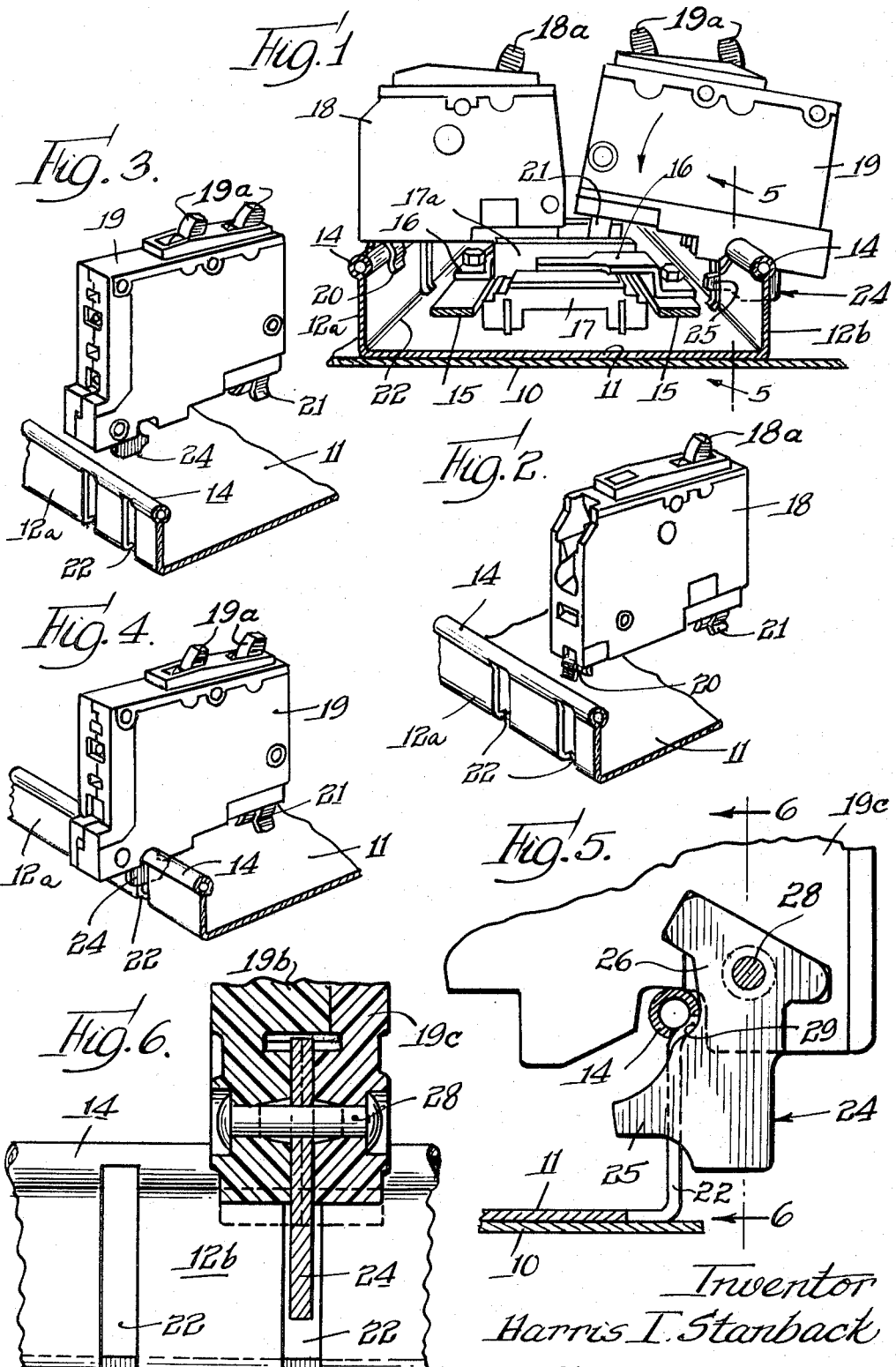

---

3,431,469
ELECTRICAL PANELBOARD WITH CIRCUIT LIMITING MEANS
Harris I. Stanback, Lexington, Ky., assignor to Square D Company, Park Ridge, Ill., a corporation of Michigan
Filed July 5, 1967, Ser. No. 651,314
U.S. Cl. 317—119
Int. Cl. H02b 1/04
9 Claims

ABSTRACT OF THE DISCLOSURE

To limit the number of branch circuits that can be accommodated in a panelboard, the panelboard has a predetermined number of slots spaced along both mounting rails of a mounting pan. Each double-circuit circuit breaker has a mounting means which permits it to be mounted only at a mounting location having one of the slots. Each single-circuit circuit breaker has a mounting means which permits it to be mounted at any mounting location.

BACKGROUND OF THE INVENTION

Field of the invention

Electrical switchboards of the panelboard or load center type.

Description of the prior art

Many different structural arrangements have been provided for ensuring that molded-case circuit breakers of relatively high current ratings can be mounted only at selected mounting locations in a panelboard and to permit circuit breakers of relatively low current ratings to be mounted at any mounting location. By preventing the mounting of circuit breakers of higher rating than the maximum safe rating at certain locations, these prior structures provide for non-interchangeability of the circuit breakers to prevent a higher rated circuit breaker from being substituted for a lower rated circuit breaker to protect a specific branch circuit passing through the panelboard. The means preventing non-interchangeability are usually alterable so that the substitution can be made if it is determined that it is safe to do so. There is no provision made in such prior panelboards, however, to limit unalterably the total number of branch circuits that the panelboard can accommodate.

SUMMARY OF THE INVENTION

The present invention is directed to means for controlling the installation of molded-case circuit breakers or other circuit protective devices in a panelboard, but differs from the prior art in that it does not control the mounting of protective devices of different ratings, but instead ensures that not more than a predetermined number of double-circuit protective devices can be mounted in a panelboard even though the panelboard has mounting spaces for additional protective devices of the same physical size.

Each branch circuit in a panelboard and its associated protective device is a source of heat. In order to limit the heat produced within a panelboard, it is necessary to limit the total number of branch circuits. When each protective device that can be mounted in the panelboard can control but one circuit, the heating of a panelboard is automatically limited by the number of spaces available for mounting the protective devices. However, when some protective devices that can be mounted in the panelboard can control two circuits and each of them does not require any more mounting space than a protective device for one circuit, it is possible to install so many double-circuit devices that the panelboard becomes overheated. Thus, the present invention, by ensuring that not more than a predetermined number of protective devices of the double-circuit type can be mounted in a panelboard, provides an upper limit on the total heat produced in a panelboard capable of accepting both single-circuit and double-circuit devices.

An electrical panelboard to which the invention may be applied comprises an enclosing box, a supporting panel in the box, a plurality of single-circuit overcurrent protective devices, and a plurality of double-circuit overcurrent protective devices. Each of the overcurrent devices is of substantially the same physical size. Means on the panel define a plurality of mounting spaces of equal size each capable of accommodating only one of the devices, the total number of the mounting spaces being less than the number of single-circuit devices that the panelboard can safely accommodate from a thermal standpoint and being greater than the number of double-circuit devices that the panelboard can accommodate from a thermal standpoint. In each of the mounting spaces, means are provided for connecting one side of a power source to one of the devices. Cooperating mounting means on the panel and on the devices secure the devices in mounted position, the mounting means on the panel and on the single-circuit devices permitting the mounting of the single-circuit devices in any of the mounting spaces.

In accordance with this invention, the mounting means on each of the double-circuit devices is different from the mounting means on each of the single-circuit devices, and the mounting means on the panel at each of a group of less than all of the mounting spaces and the mounting means on the double-circuit devices include means which cooperate to permit the mounting of the double-circuit devices in any of the mounting spaces in the group. Each of the mounting means on the double-circuit devices, however, includes interfering means which interferes with the mounting means on the panel at the mounting spaces not in the group thereby to prevent mounting of the double-circuit devices in any of the mounting spaces not in the group.

More specifically, in accordance with this invention, the mounting means on the panel comprises a rail having a beaded flange and the mounting means on each of the single-circuit devices comprises a resilient clip that clamps over the bead on the flange at any mounting space. The mounting means on the panel for the double-circuit devices includes a predetermined number of slots formed in the mounting rail of the panelboard, each slot being at a mounting space for a protective device thereby to define a group of mounting spaces for the double-circuit devices. The double-circuit devices are each provided with a mounting means which interferes with the mounting rail at any of the mounting spaces not in the group and thereby prevents the device from being mounted at any mounting space not in the group.

BRIEF DESCRIPTION OF THE DRAWING

FIG. 1 is an elevation, partially in section, of a panelboard in accordance with the present invention;

FIG. 2 is a perspective view of a portion of the structure of FIG. 1 showing a single-circuit circuit breaker preparatory to being mounted;

FIG. 3 is a perspective view similar to FIG. 2 but showing a double-circuit circuit breaker preparatory to being mounted;

FIG. 4 is a perspective view of a portion of the structure of FIG. 1 showing a double-circuit circuit breaker mounted in a mounting space; and FIGS. 5 and 6 are sectional views taken generally along the line 5—5 of FIG. 1 and the line 6—6 of FIG. 5, respectively.

DESCRIPTION OF THE PREFERRED EMBODIMENT

Referring to FIG. 1, there is shown a back wall 10 of a panelboard box to which is secured a mounting pan 11 having, at its opposite sides, upturned flanges 12a and 12b provided at their outer ends with respective continuous beaded portions 14. Secured to, but insulated from, the mounting pan 11 between the flanges 12a and 12b is a pair of transversely spaced, longitudinally extending bus bars 15 to which bus bar extensions 16 are electrically and mechanically secured. The bus bar extensions 16 extend transversely from their associated one of the bus bars 15 toward the other bus bar in alternate arrangement between upstanding barriers 17a of insulators 17 to define longitudinally spaced mounting spaces of equal width for circuit protective devices such as the molded-case circuit breakers 18 and 19 and to provide for an electrical connection between each of the circuit breakers and one of the bus bars 15. A further description of such a panelboard is in U.S. Patent No. 3,105,173 which issued on Sept. 24, 1963.

The circuit breaker 18 is representative of one group of circuit protective devices mountable in the panelboard and is a single-circuit circuit breaker as indicated by its single operating handle 18a. It may be of the type disclosed in U.S. Patent 2,902,560 which issued on Sept. 1, 1959. The circuit breaker 19 is representative of another group of circuit protective devices and is a double-circuit circuit breaker as indicated by its two operating handles 19a. It may be of the type disclosed in U.S. Patent No. 3,134,051 which issued on May 19, 1964. The circuit breakers 18 and 19 are of substantially the same physical dimensions. Although the circuit protective devices are shown in the drawing as circuit breakers 18 and 19, it is apparent that the devices could be single or double-circuit fusible units of the types respectively disclosed, for example, in U.S. application Ser. No. 420,570 filed Dec. 23. 1964, and assigned to the assignee of the present application, and in U.S. Patent No. 3,284,598 which issued on Nov. 8, 1966.

As mentioned, it is desirable that means be provided to restrict the number of the double-circuit protective devices that can be mounted in the panelboard, whereas no restriction other than the number of available mounting spaces should be placed on the number of the single-circuit protective devices that can be mounted therein.

Each of a plurality of the single-circuit circuit breakers 18 can be mounted in the panelboard in the manner shown in Patent No. 3,105,173 by forcing a resilient mounting clip 20 over one of the beaded portions 14 at a mounting space and at the same time forcing a pair of plug-in jaws 21 over one of the bus bar extensions 16. It is apparent that each of the circuit breakers 18 can be mounted in any of the mounting spaces.

To limit the number of the double-circuit circuit breakers 19 that can be mounted in the panelboard, the circuit breakers 19 have a different type of mounting means than the circuit breakers 18. The mounting means on the circuit breakers 19 interferes with the flanges 12a and 12b unless provision is made to prevent the interference. To this end, one or both of the flanges 12a and 12b beneath their respective beaded portions 14 are provided, in accordance with this invention, with a plurality of upright elongated slots 22 thereby to define a group of double-circuit mounting spaces. Each of the slots 22 is transversely aligned with a respective one of the bus bar extensions 16 and extends from the bottom of the pan 11 to its associated beaded portion 14. As will become apparent, the total number of slots in the group determines the total number of the double-circuit circuit breakers 19 that can be mounted in the panelboard.

Each of the double-circuit circuit breakers 19 is provided with a pair of plug-in jaws 21 identical with the jaws 21 of the circuit breakers 18 so that it can be mechanically and electrically secured to any one of the bus bar extensions 16. However, the mounting means for the circuit breakers 19 which cooperates with the rails 12a or 12b differs from that of the circuit breakers 18 in that instead of being a resilient clip it comprises a hook member 24 having a nose portion 25 that must pass through one of the slots 22 in order to mount the circuit breaker. Each hook member 24 has a generally T-shaped upper portion 26 which is received in a correspondingly shaped clearance space provided between a pair of housing portions 19b and 19c of its associated circuit breaker 19 and is provided with an opening which receives a rivet 28 serving to hold the two portions 19b and 19c of the housing together and the hook member 24 therebetween. Above the nose portion 25 is an arcuate portion 29 which, when a circuit breaker 19 is mounted, bears against the lower periphery of the beaded portion 14 at the top of one of the slots 22. Preferably, each of the hook members 24 is relatively thick and is made of hardened steel so that, if excessive force is exerted against it in an attempt to modify one of the circuit breakers 19 so that it can be mounted at a location where there is no slot 22, the force will destroy one or both of the molded housing portions 19b or 19c.

To mount one of the circuit breakers 19 in the panelboard, the circuit breaker 19 is tilted at an angle of about 30° to 45° with respect to the back wall 10 and is then moved inwardly transversely of the panelboard so that the nose portion 25 of its hook member 24 enters one of the slots 22. The circuit breaker 19 is then rotated until its plug-in jaws 21 engage one of the bus bar extensions 16. The bottom wall of the circuit breaker 19 then engages the top of the beaded portion 14 and the edge face of the arcuate portion 29 engages the top wall of the slot 22 at the lower periphery of the beaded portion 14 thereby to hold the circuit breaker 19 securely in mounted position.

It should be noted that there is no provision for modification of the mounting rails 12a and 12b after initial manufacture. If a panelboard is of a size that can accommodate a maximum of only a certain number of double-circuit devices for thermal reasons, the provision of a total of that number of slots in the mounting rails definitely provides the desired thermal limitation.

I claim:

1. In an electrical panelboard comprising an enclosing box, a supporting panel in the box, a plurality of single-circuit overcurrent protective devices, a plurality of double-circuit overcurrent protective devices, each of said devices being of substantially the same physical size, means on the panel defining a plurality of mounting spaces of equal size each capable of accommodating only one of said devices, the total number of the mounting spaces being less than the number of single-circuit devices that the panelboard can safely accommodate from a thermal standpoint and being greater than the number of double-circuit devices that the panelboard can accommodate from a thermal standpoint, means in each of said mounting spaces for completing an electrical circuit to one of said devices when mounted therein, and cooperating mounting means on the panel and on said devices for securing said devices in mounted position, the mounting means on the panel and on said single-circuit devices permitting the mounting of said single-circuit devices in any of said mounting spaces, the improvement being characterized in that the mounting means on said double-circuit devices is different from the mounting means on said single-circuit devices, the mounting means on the panel at each of a group of less than all of said mounting spaces and the mounting means on said double-circuit devices include means which cooperate to permit the mounting of said double-circuit devices in any of said mounting spaces in said group, and the mounting means on said double-circuit devices each includes interfering means which interferes with the mounting means in the mounting spaces not in said group thereby to prevent mounting of said double-circuit devices in any of said mounting spaces not in said group.

2. A panelboard in accordance with claim 1 wherein said protective devices are molded-case circuit breakers.

3. A panelboard in accordance with claim 1 wherein at least one bus bar extends longitudinally of the panelboard and the means for completing the electrical circuits to the devices comprises a plurality of bus bar extensions electrically connected to the bus bar.

4. A panelboard in accordance with claim 1 wherein a pair of bus bars extend longitudinally of the panelboard in parallel-spaced relation and the means for completing the electrical circuits to the devices comprises a plurality of bus bar extensions extending transversely of the panelboard, arranged in a row longitudinally of the panelboard, and connected to the bus bars in alternate arrangement along the row.

5. A panelboard in accordance with claim 3 wherein the mounting means on the panel comprises an upstanding flange-like member extending longitudinally of the panelboard in parallel-spaced relation to the bus bar.

6. A panelboard in accordance with claim 5 wherein the mounting means on each of the single-circuit devices is a resilient clip removably engageable with the flange-like member.

7. A panelboard in accordance with claim 5 wherein the mounting means on each of the double-circuit devices is a hook-like member.

8. A panelboard in accordance with claim 7 wherein the flange-like member has an opening therethrough at each mounting space on the panel in said group and the hook-like member for each double-circuit device has a portion that must pass through said opening upon mounting of each of the double-circuit devices.

9. A panelboard in accordance with claim 5 wherein the flange-like member has a continuous beaded portion at its outer edge, the mounting means on each single-circuit device is a resilient clip removably engageable with said bead at any mounting space, a slot is provided in said flange-like member at each mounting space of said group, said flange-like member forms a solid barrier at all other of said mounting spaces, and the mounting means on each double-circuit device is a hook-like member which passes through said slot and engages the upper edge of the slot beneath the bead.

References Cited

UNITED STATES PATENTS 3,150,290    9/1964    Edmunds _____ 317—119

LEWIS H. MYERS, *Primary Examiner.*

J. R. SCOTT, *Assistant Examiner.*